March 31, 1970  E. P. OPSAHL  3,504,282
MAGNETOSTRICTIVE CURRENT RESPONSIVE MEANS AND TRANSDUCER MEANS
UTILIZING CHANGES IN DIMENSIONS OF THE MAGNETOSTRICTIVE
MEANS TO PRODUCE A VARIABLE SIGNAL WHICH VARIES
WITH CURRENT VARIATIONS
Filed Oct. 14, 1964
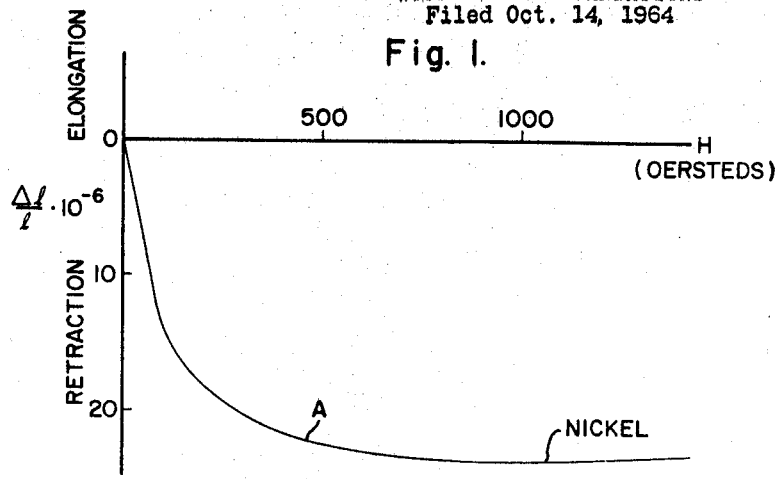
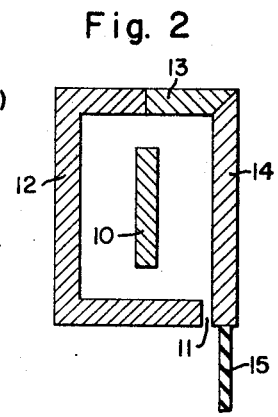
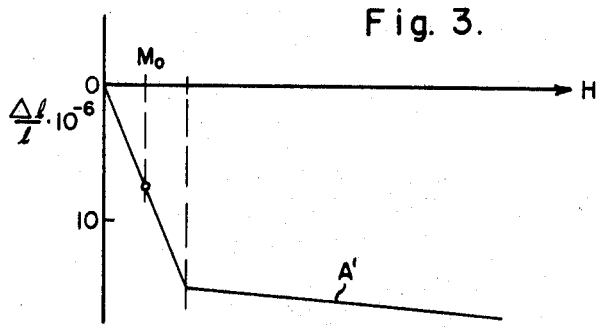
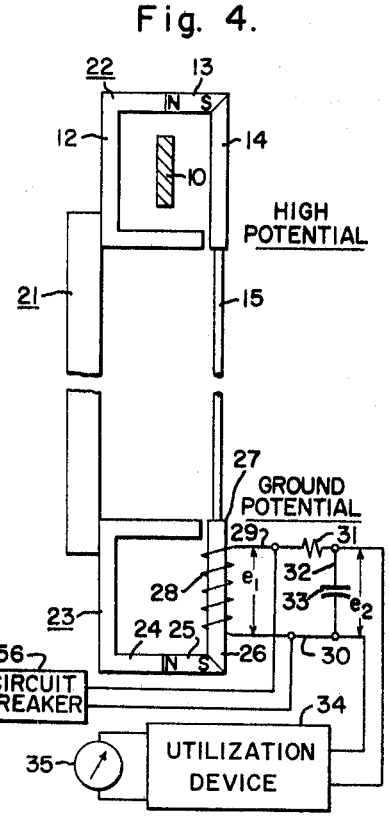
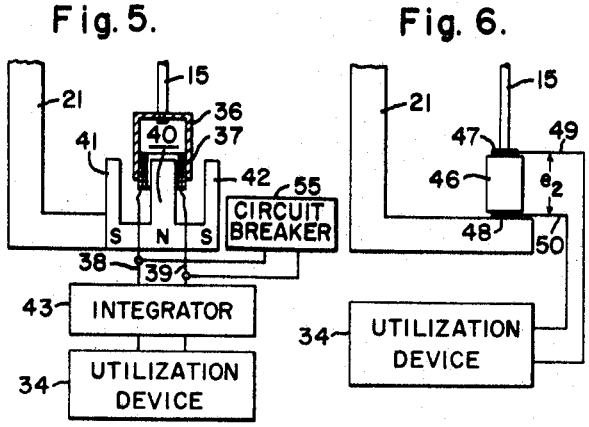
WITNESSES:
John L. Chopp
James F. Young
INVENTOR
Einar P. Opsahl
BY Maury I. Hull
ATTORNEY

# United States Patent Office 3,504,282
Patented Mar. 31, 1970

3,504,282
MAGNETOSTRICTIVE CURRENT RESPONSIVE MEANS AND TRANSDUCER MEANS UTILIZING CHANGES IN DIMENSIONS OF THE MAGNETOSTRICTIVE MEANS TO PRODUCE A VARIABLE SIGNAL WHICH VARIES WITH CURRENT VARIATIONS
Einar P. Opsahl, Suldal, Norway, assignor to Westinghouse Electric Corporation, East Pittsburgh, Pa., a corporation of Pennsylvania
Filed Oct. 14, 1964, Ser. No. 403,816
Int. Cl. G01r 19/16
U.S. Cl. 324—127                                8 Claims

ABSTRACT OF THE DISCLOSURE

Magnetic circuit forming means including a portion of magnetostrictive material is disposed around a high voltage conductor, the magnetostrictive portion changing in length with changes in intensity of the magnetic field applied thereto resulting from changes in the value of current in the conductor. Transducer means which may be magnetic, piezoelectric, or magnetostrictive is located at a remote point. Insulating means connects the magnetostrictive portion at the conductor to the transducer means to utilize variations in length to provide a signal which varies with variations in current.

---

This invention relates to improvements in apparatus responsive to current in a high voltage conductor, such for example as apparatus for indicating and measuring the current in the high voltage line, and more particularly to such apparatus utilizing a magnetostrictive device at the high voltage line for obtaining a varying displacement corresponding to variations in the current in the line.

As will be well known by those working with high voltages, current transformers for high voltage lines are expensive because of the necessity for insulating the current transformer for peak voltages between the line and ground. Accordingly, a number of attempts have been made to find substitutes for the conventional current transformer, some of these devices being described in patents constituting part of the prior art.

Generally speaking, such devices have encountered a number of difficulties resulting either from variations in the characteristics of a signal transmission path between the high voltage line and detector apparatus located at a remote point at ground potential, variations in atmospheric conditions, or variations in ambient temperature conditions, etc.

My invention overcomes many of the problems and difficulties of prior art devices. In summary, I provide means forming a magnetic circuit around a high voltage conductor carrying a current, an elongated portion of the magnetic circuit being formed of highly magnetostrictive material such for example as nickel or a 60% cobalt-iron alloy. The means forming the magnetic circuit also includes a permanently magnetized portion to provide a magnetic bias. Variations in line current cause variations in the length of the magnetostrictive portion, and this variation in length displaces the end of an insulating rod attached to one end of the magnetostrictive material, with the result that vibrations are transmitted through the rod, composed of insulating material such as glass, to a transducer located at ground potential, where the movements of the ground end of the rod in response to variations in the dimensions of the magnetostrictive material at the high voltage line are translated into an electrical signal which may be proportional to the rate of change of the current in the high voltage current carrying conductor, or may be proportional to the current in the high voltage conductor, depending upon the type of transducer used. The transducer at ground potential in one embodiment of my invention includes a piezoelectric element having electrodes at the ends thereof, the piezoelectric element being stressed periodically by changes in the rod length as a result of the changes in the length of the magnetostrictive portion of the magnetic circuit forming means associated with the high voltage conductor. In other embodiments the transducer employs movable coil means moving in a magnetic field, or magnetostrictive means having a pickup coil disposed therearound.

Accordingly, a primary object of my invention is to provide new and improved current responsive apparatus for use with a high voltage line.

Another object is to provide new and improved means for measuring the current in a high voltage line.

A further object is to provide magnetostrictive means for obtaining a signal which varies with variations in the current in a high voltage line.

These and other objects will become more clearly apparent after a study of the following specification when read in connection with the accompanying drawings, in which:

FIGURE 1 is a graph illustrating the retraction or elongation of a magnetostrictive material, in the graph shown nickel, with variations in the strength or intensity of a magnetic field;

FIG. 2 is a cross-sectional view through the magnetic circuit forming means associated with the high voltage conductor for obtaining dimension changes corresponding to current changes, for transmission by a connecting rod of insulating material to transducer and utilization means located at a remote point at ground potential;

FIG. 3 is a graph illustrating the effect of a biasing field formed by the permanent magnet portion of the magnetic circuit upon the retraction as a function of field intensity characteristic of the material in FIG. 1;

FIG. 4 is a view of signal generating apparatus at the high voltage conductor, and transducing apparatus at ground potential interconnected by an insulating rod;

FIG. 5 is a diagram of an additional transducer arrangement suitable for use at the remote point; and FIG. 6 is an electrical schematic circuit diagram of a transducer at ground potential according to the preferred embodiment of my invention.

Referring now to the drawings for a more detailed understanding of the invention, in which like reference numerals are used throughout to designate like parts, there is shown in FIG. 1 a graph illustrating changes in dimension of nickel as a result of changes in the strength of magnetic field. It is noted that where nickel is the magnetostrictive material, retraction occurs as the magnetic field intensity increases, retraction being plotted along the ordinate, and field intensity or field strength in oersteds being plotted along the abscissa. It is noted that for changes in field strength up to approximately 100 oersteds, the relationship is linear.

Particular reference is made now to FIG. 2. The high voltage conductor generally designated 10 has means forming a magnetic circuit substantially enclosing the conductor but leaving a small air-gap at 11. The magnetic circuit forming means includes three abutting portions, a portion 12 composed of magnetizable material, a portion 13 composed of permanently magnetized material for setting up a magnetic bias, and a portion 14 composed of highly magnetostrictive material such, for example, as nickel. The portion 14 has an insulating rod 15 secured thereto in any convenient manner, not shown, the rod 15 transmitting changes in the length of portion 14 to transducer apparatus at ground potential.

Portions 12, 13 may be of laminated construction if desired. Air gap 11 is provided to ensure that the adjacent end of portion 14 is free to move and transmit motion to rod 15. Air gap 11 is also desirable to prevent saturation and facilitate operation of the apparatus over the linear portion of the characteristic curve.

The magnetostrictive effect, in which a change in the magnetic field intensity applied to certain materials results in a change in the dimensions, particularly the length, of the material is well known, and it is also well known that materials vary widely in their magnetostrictive properties. This effect, where there are changes in the dimensions of ferromagnetic substances as they are magnetized is sometimes called the Joule effect. As previously stated, in an increasing field, nickel decreases in length, while iron increases in length in fields up to perhaps 200 or 300 oersteds, and thereafter iron decreases in length for further increases in magnetic field strength. Conversely, a nickel rod in a mangetic field shows increased intensity of magnetization when under longitudinal compression and decreased intensity when under tension; this is sometimes called the Villari effect. The Villari effect may be utilized in transducing apparatus at ground potential, as will become more clearly apparent hereinafter.

For a more detailed understanding of magnetostriction, reference may be had to a discussion of ferromagnetic domain theories, found on page 75 of an article entitled "Ferromagnetic Domains" by Lt. Philip I. Hershberg, appearing in "Electro-Technology," January 1962.

Particular reference is made now to the graph of FIG. 3. A steady state biasing field $M_0$ is provided by the aforementioned portion 13 of permanently magnetized material. By suitable choice of dimensions and materials it is provided that changes in the magnetic field about the current carrying conductor 10 cause the retraction of portion 14 to vary within limits not exceeding the linear portion of the curve A', FIG. 3. As a result, the change in dimension of the magnetostrictive material will momentarily respond to a change in the magnetic field, or in other words to a change in the line current. As long as the magnetic circuit forming apparatus works in the linear part of the curve of FIG. 3, the change in dimension will correspond to the change in current over the alternating current cycle with great accuracy.

Particular reference is made now to FIG. 4, where insulating supporting means generally designated 21 is shown for supporting the magnetic circuit forming means 22 adjacent or around but spaced from the high voltage conductor 10, the magnetic circuit forming means including portions 12, 13 and 14 as before.

At the lower extremity of the supporting means 21 there is a transducer similar to the magnetic circuit forming means 22, the transducer being generally designated 23 and having a shape similar to that of the magnetic circuit forming means 22. Transducer 23 includes a portion 24 of magnetizable material, a portion 25 of permanently magnetized material, and a portion 26 of magnetostrictive material which may be, for example, nickel, and should preferably be the same material as that used at the high voltage conductor. The upper end 27 of the magnetostrictive portion 26 has firmly abutting thereagainst the lower end of the rod 15, and the lower end of rod 15 may be secured at 27 by any convenient means, not shown. Wound around the magnetostrictive portion 26 but spaced therefrom so that the coil does not impede changes in the dimension of portion 26 is a coil 28 having leads 29 and 30 therefrom connected to an integrating circuit comprising resistor 31, lead 32 and capacitor 33. Leads 30 and 32 are thence connected to a utilization device 34, which may include an indicating device 35 calibrated in values of current in line 10.

In the operation of the apparatus in FIG. 4, mechanical signals are transmitted from the high voltage line to the transducer at ground potential through the insulating rod or tube 15. The insulating rod or tube 15 may be composed of glass, in which the velocity of sound is approximately 6000 meters/sec. or 19,700 ft./sec. In a rod of the order of 10 ft. in length, the time lag would be of the order of $\Delta T = 0.5 \times 10^{-3}$ seconds. Since the velocity $v$ is equal to the frequency F times the wavelength λ, the wavelength in glass with a 60 cycle per second alternating current in conductor 10 is approximately 280 ft. A 10 ft. rod would then be 1/28 of a wavelength, and there would be no resonance at 60 cycles per second. At the receiving end, the rod should be arranged and the device should be so constructed that there is no reflection of signals. It will also be understood that in the absence of any signal transmission from the high voltage conductor the ends of the rod 15 should be at fixed positions with respect to each other. Support 21 provides for this.

The transducer 23 makes use of the aforementioned Villari effect in a magnetostrictive material. The nickel rod 26 in the magnetic field shows increased intensity of magnetization when under longitudinal compression from rod 15, and decreased intensity when under tension. These variations in the intensity of magnetization in portion 26 result in corresponding changes in a voltage induced in the aforementioned coil 28. The induced voltage $e_1$, is proportional to the rate of change of the current in the current carrying conductor 10. The voltage across leads 30 and 32, $e_2$, is proportional to the current in the current carrying conductor 10, since $$e_2 = \frac{1}{RC}\int e_1 dt$$

Particular reference is made now to FIG. 5, in which another transducer arrangement is shown. The end of rod 15 in FIG. 5 is seen to have attached thereto a housing 36 preferably composed of non-magnetic material to which is secured a coil 37 having output leads 38 and 39. The coil 37 has centrally disposed therein but with sufficient spacing to permit free relative movement one pole, for example, the north pole of a magnet 40, with portions 41 and 42 forming south poles. The entire structure is rigidly secured to the supporting means 21. Coil 37 is moved back and forth in the magnetic field between pole 40 and poles 41 and 42 in accordance with variations in the length of the magnetostrictive portion 14 disposed adjacent the high voltage line 10, and accordingly a signal is induced in the leads 38 and 39 proportional to the rate of change of current in conductor 10. The signal across leads 38 and 39 may be integrated at 43 to obtain a signal proportional to the current in conductor 10, and this latter signal may be applied to utilization device 34.

Particular reference is made now to FIG. 6, showing the preferred embodiment of the invention. The supporting structure 21 has securely mounted thereon a piezoelectric element 46 having electrodes 47 and 48 from which leads 49 and 50 are taken. The lower end of rod 15 fits snugly adjacent the upper electrode 47 and may be secured thereto by any convenient means, not shown. In accordance with well known piezoelectric theory, pressure applied to the piezoelectric element 46 from the rod 15 sets up stresses in the piezoelectric element which cause the generation of a signal across leads 49 and 50. This signal will vary with variations in the current in conductor 10.

The rod 15 should preferably have a stiffness greater than, and preferably several times greater than, the stiffness of the piezoelectric material 46 in FIG. 6, so that displacement of the end of the rod 15 at the high voltage end will be transmitted without substantial loss to the transducer element.

The element or portion 14 may be a 60% cobalt-iron alloy, which would undergo elongation as the magnetic field increased in intensity. Element 26 of transducer 23 may be the 60% cobalt-iron alloy, showing decreased intensity of magnetization under longitudinal compression.

The displacement producing means of FIG. 2 may be used to obtain a displacement proportional to a direct current in conductor 10. Where conductor 10 carries a direct current, biasing element 13 may be omitted, if desired.

If desired, transducer 23 may be mounted at one end of a high voltage bushing having an axial aperture, and magnetic circuit forming means 22 at the other end of the bushing.

Other suitable materials in addition to glass may be esed for the connecting rod 15. If desired, the connecting rod may be protected from the atmosphere, as by utilizing the aforementioned bushing mounting arrangement.

In constructing the magnetic circuit forming means, a convenient procedure may be to provide a permanent magnetic field portion 13, and then adjust the width of the air gap 11 until the steady bias field strength reaches a value corresponding to the field strength at the center of the linear portion of the retraction as a function of field intensity characteristic curve.

In FIG. 4, the signal across leads 29 and 30, which is proportional to the rate of change of current in conductor 10, is utilized to control circuit breaker apparatus 56. It will be readily understood by those skilled in the art that a severe fault current, such as that caused by a short circuit, causes a very rapid change in current, and this change in current can be utilized to initiate opening the line without waiting for the current in the line to reach zero value. In like manner, in FIG. 5, circuit breaker 55 is controlled by a signal on leads 38 and 39 proportional to the rate of change of current in line or conductor 10.

The utilization device 34 of FIG. 6 may be a circuit breaker device.

Whereas the invention has been shown and described with respect to measuring current in a high voltage conductor, it should be understood that it may be used on any current carrying conductor.

Whereas I have shown and described my invention with respect to some embodiments thereof which give satisfactory results, it should be understood that changes may be made and equivalents substituted without departing from the spirit and scope of the invention.

I claim as my invention:

1. Current responsive apparatus for a high voltage alternating current conductor comprising, in combination, magnetic circuit forming means disposed around the high voltage conductor, substantially enclosing the conductor and spaced therefrom, the mangetic circuit forming means including a first portion composed of magnetizable material, a second portion composed of permanently magnetized material having one end thereof rigidly secured to and abutting against one end of the portion of magnetizable material whereby the adjacent end of the permanently magnetized material is prevented from moving substantially with respect to the first portion, a third portion composed of magnetostrictive material which changes its length with changes in the intensity of the magnetic field applied thereto as the instantaneous current in the conductor changes during an alternation, the third portion of magnetostrictive material having one end thereof abutting against the other end of the portion of permanently magnetized material whereby the permanently magnetized material adjacent the end of the portion of magnetostrictive material provides a magnetic bias for the magnetostrictive material, insulating displacement transmitting means secured to the other end of the portion of magnetostrictive material, the magnetic bias insuring that the magnetostrictive material has a characteristic of retraction and elongation within the range of magnetic field strengths applied thereto as a result of current flowing in the conductor which is linear within said range, current flowing in the conductor causing the total magnetic field strength at the third magnetostrictive portion to vary periodically within said range and the length of the magnetostrictive portion to vary linearly periodically as the current and magnetic field strength vary whereby the displacement of the insulating displacement transmitting means is a linear function of the current, transducer means located at a remote position having a fixed portion and a signal generating portion operatively connected to the other end of the insulating displacement transmitting means, and means for securing the portion of the magnetic circuit forming means at the conductor which is composed of magnetizable material against movement with respect to the fixed portion of the transducer means, the transducer means utilizing displacement transmitted thereto to generate an electrical signal which is proportional in amplitude to the current flowing in the high voltage conductor.

2. Apparatus according to claim 1 including in addition utilization means connected to the transducer means for utilizing the electrical signal to give an indication of the value of the current in the conductor.

3. Apparatus according to claim 1 in which the transducer means located at the remote position includes magnetic core means having a portion thereof composed of magnetostrictive material and in which the insulating displacement transmitting means transmits displacement to said magnetostrictive material whereby the magnetostrictive portion is periodically compressed and elongated, and coil means electromagnetically coupled to the magnetic core means whereby variations in length of the magnetostrictive portion of the magnetic core means generate a signal in the coil means which varies with variations in the current in the high voltage conductor.

4. Apparatus according to claim 3 including in addition utilization means having the signal produced in the coil means applied thereto.

5. Apparatus according to claim 4 in which the transducer means located at the remote position includes a piezoelectric element having first and second spaced electrodes mounted thereon on opposite sides of the piezoelectric element respectively, the adjacent end of the insulating displacement transmitting means firmly abutting against one of said elements whereby variations in length of the magnetostrictive portion at the conductor are transmitted to the piezoelectric element and produce a variable signal between the first and second electrodes which varies in accordance with variations in the current in the high voltage conductor.

6. Apparatus according to claim 5 including in addition a utilization device connected to the electrodes of the piezoelectric element.

7. Apparatus according to claim 1 in which the transducer means at the remote position includes coil means operatively connected to the adjacent end of the insulating displacement transmitting means and moved thereby, and magnetic field producing means mounted in a predetermined fixed position with respect to the coil means whereby variations in the position of the coil means in response to variations in the length of the magnetostrictive portion near the conductor cause the generation of a varying electrical signal in the coil means.

8. Current responsive apparatus for a high voltage conductor according to claim 7 including in addition integrator means connected to the coil means for obtaining a further electrical signal which varies with variations in the current in the conductor, and a utilization device connected to the integrator means.

References Cited

UNITED STATES PATENTS

| | | | |
|---|---|---|---|
| 2,375,591 | 5/1945 | Schweitzer | 324—127 XR |
| 2,661,622 | 12/1953 | Severs | 73—71.4 |
| 2,709,800 | 5/1955 | Temple et al. | 324—127 XR |
| 2,998,536 | 8/1961 | Dubsky et al. | |
| 3,090,226 | 5/1963 | Corti et al. | 340—195 XR |
| 1,841,459 | 1/1932 | Taylor | 310—8.3 |
| 2,375,591 | 5/1945 | Schweitzer | 324—127 XR |
| 2,391,678 | 12/1945 | Bundy | 335—215 XR |
| 2,402,544 | 6/1946 | Foulds | 324—127 XR |
| 3,029,766 | 4/1962 | Jones | 310—26 XR |
| 3,138,742 | 6/1964 | Schweitzer | 324—127 XR |
| 3,331,023 | 7/1967 | Adkins et al. | 324—127 |

FOREIGN PATENTS

| | | |
|---|---|---|
| 541,953 | 6/1957 | Canada. |
| 538,476 | 10/1931 | Germany. |

OTHER REFERENCES

Nesbitt, E. A.: The Magnetostriction of Permanent Magnet Alloys, Journal of Applied Physics, vol. 21, September 1950, pp. 879–881.

GERARD R. STRECKER, Primary Examiner

U.S. Cl. X.R.

310—26; 317—143; 335—215